United States Patent [19]

Wiedermann et al.

[11] Patent Number: 5,367,000
[45] Date of Patent: Nov. 22, 1994

[54] PROCESS FOR THE PRODUCTION OF RIGID FOAMS CONTAINING URETHANE AND ISOCYANURATE GROUPS

[75] Inventors: Rolf Wiedermann, Odenthal; Stephan Wendel; Ulrich Weber, both of Leverkusen, all of Germany

[73] Assignee: Bayer Aktiengesellschaft, Leverkusen, Germany

[21] Appl. No.: 186,189

[22] Filed: Jan. 24, 1994

[30] Foreign Application Priority Data

Jan. 29, 1993 [DE] Germany .............................. 4302460

[51] Int. Cl.$^5$ .............................................. C08G 18/00
[52] U.S. Cl. ...................................... 521/131; 521/902
[58] Field of Search ................................ 521/131, 902

[56] References Cited

U.S. PATENT DOCUMENTS

| | | | |
|---|---|---|---|
| 5,096,933 | 3/1992 | Volkert ................................. | 521/131 |
| 5,223,549 | 6/1993 | Wiedermann et al. ............. | 521/107 |

FOREIGN PATENT DOCUMENTS 4109076 11/1991 Germany .
4020283 1/1992 Germany .
4129285 3/1993 Germany .

*Primary Examiner*—Maurice J. Welsh
*Attorney, Agent, or Firm*—Joseph C. Gil

[57] ABSTRACT

Rigid foams containing urethane and isocyanurate groups are obtained by using of mixtures of i) n-pentane and/or isopentane and ii) cyclopentane as blowing agents.

5 Claims, No Drawings

PROCESS FOR THE PRODUCTION OF RIGID FOAMS CONTAINING URETHANE AND ISOCYANURATE GROUPS

BACKGROUND OF THE INVENTION

The present invention relates to a process for the production of flameproofed, CFC-free rigid foams containing urethane and isocyanurate groups.

German Offenlegungsschriften 4,109,076, 4,026,702, 4,129,285, and 4,020,283 and published European patent application 421,269 describe processes for the production of halogen-free rigid polyurethane ("PUR") foams using water and hydrocarbons. The use of water as blowing agent has the disadvantage that the surface of the PUR foams is embrittled (surface brittleness) by the formation of polyurethane structures because of the reaction of isocyanate with water with elimination of carbon dioxide, adversely affecting the adhesion between the foam and the surface skin.

Although surface brittleness can be prevented by using hydrocarbons as sole blowing agent, the percentage content of flameproofing agents, which normally act as plasticizers, must be increased to ensure flame resistance, so that hydrocarbon-blown rigid PUR foams are generally not dimensionally stable and show shrinkage/contraction, particularly where cyclopentane is used as the blowing agent.

It has already been found that dimensionally stable hydrocarbonblown rigid PUP foams can be obtained by using branched-chain polyols without any adverse effect on flame retardancy (flame resistance).

DESCRIPTION OF THE INVENTION

It has now surprisingly been found that if suitable hydrocarbon mixtures are used as blowing agents, the polyols used do not necessarily have to contain branched chains to give dimensionally stable foams. Suitable hydrocarbon mixtures are mixtures of n- and/or i-pentane and cyclopentane, and more preferably mixtures containing less than 50% by weight cyclopentane.

The present invention relates to a process for the production of rigid foams containing urethane and isocyanurate groups comprising reacting
a) polyisocyanates with
b) compounds containing at least two isocyanate-reactive hydrogen atoms and having molecular weights of from 400 to 10,000 and
c) optionally compounds containing at least two isocyanate-reactive hydrogen atoms and having molecular weights of from 32 to 399 in the presence of
d) one or more NCO trimerization catalysts,
e) mixtures of hydrocarbons as blowing agents and
f) optionally, flameproofing agents, other blowing agents and other auxiliaries and additives generally known in the polyurethane art, wherein said mixtures of hydrocarbons are mixtures of n-pentane and isopentane with cyclopentane.

In a preferred embodiment of the invention, the hydrocarbon mixture contains 1 to 50% by weight cyclopentane. In another preferred embodiment, a mixture of n-pentane and 1 to 50% by weight of cyclopentane is used and water is included as another blowing agent preferably in an amount of 1 to 5 parts by weight, more preferably 1 to 3 parts by weight, water per 100 parts by weight of component b). In the most preferred embodiment, the rigid foam product contains predominant amounts of isocyanurate groups. The foams of the present invention are useful as insulating materials.

The production of foams containing urethane and isocyanurate groups is known in the art and is described, for example, in German Patent 1,112,285, British patent 1,104,394, German Offenlegungsschriften 1,595,844 and 1,769,023 and in Kunststoff-Handbuch, Vol. VII, Polyurethane, edited by Vieweg and Höchtlen, Carl Hanser Verlag, München 1966 and in the edition of this book edited by G. Oertel, Carl-Hanser-Verlag, München/Wien 1983.

The materials used for the production of the foams herein are known in the art.

Useful isocyanates include aliphatic, cycloaliphatic, araliphatic, aromatic and heterocyclic polyisocyanates of the type known in the art and described, for example, by W. Siefken in Justus Liebigs Annalert der Chemie, 562, pages 75 to 136. Specific examples include those corresponding to the following formula:

$Q(NCO)_n$ where $n=2-4$, preferably 2-3, and Q is an aliphatic hydrocarbon radical containing 2 to 18 and preferably 6 carbon atoms, a cycloaliphatic hydrocarbon radical containing 4 to 15 and preferably 5 to 10 carbon atoms, an aromatic hydrocarbon radical containing 6 to 15 and preferably 6 to 13 carbon atoms or an araliphatic hydrocarbon radical containing 8 to 15 and preferably 8 to 13 carbon atoms, such as those described in German Offenlegungsschrift 2,832,253, pp. 10–11. In general, it is particularly preferred to use commercially available polyisocyanates such as e 2,4- and 2,6-tolylene diisocyanate and mixtures of these isomers ("TDI"); polyphenyl/polymethylene polyisocyanates of the type obtained by phosgenation of aniline/formaldehyde condensates ("crude MDI"); and polyisocyanates containing carbodiimide groups, urethane groups, allophanate groups, isocyanurate groups, urea groups or biuret groups ("modified polyisocyanates"), particularly modified polyisocyanates derived from 2,4- and/or 2,6-tolylene diisocyanate and from 4,4'- and/or 2,4'-diphenyl methane diisocyanate.

Also necessary are compounds containing at least two isocyanate-reactive hydrogen atoms and having molecular weights of from 400 to 10,000. In addition to aminefunctional, thiofunctional or carboxyfunctional compounds, the compounds in question are preferably hydroxyfunctional compounds, and more particularly compounds containing 2 to 8 hydroxyl groups, especially those having a molecular weight in the range from 1,000 to 6,000 and preferably 2,000 to 6,000. Specific examples of such hydroxyl functional compounds are polyethers and polyesters generally containing 2 to 8, but preferably 2 to 6 hydroxyl groups and polycarbonates and polyester amides of the type known per se for the production of homogeneous and cellular polyurethanes and described, for example, in German Offenlegungsschrift 2,832,253, pages 11–18.

Other optional starting components include compounds containing at least two isocyanate-reactive hydrogen atoms and having molecular weight of from 32 to 399. In this case, too, the compounds in question are hydroxyfunctional and/or aminofunctional and/or thiofunctional and/or carboxyfunctional compounds, preferably hydroxyfunctional and/or aminofunctional compounds which serve as chain-extending agents or cross-linking agents. These compounds generally contain 2 to 8 and preferably 2 to 4 isocyanate-reactive hydrogen atoms. Examples of such compounds can be found on pages 19 to 20 of German Offenlegungsschrift 2,832,253.

The isocyanate trimerization catalysts used in accordance with the invention are known in the art.

Mixtures of pentane and/or isopentane with cyclopentane are used as blowing agents.

Auxiliaries and additives can optionally be used. These include other readily volatile organic substances and/or water as additional blowing agents; additional catalysts of the type known per se from polyurethane chemistry in quantities of up to 10% by weight, based on the quantities of component b); surface-active additives, such as emulsifiers and foam stabilizers; flameproofing agents, for example phosphorus-containing halogen-free flameproofing agents, such as triethyl phosphate, diphenyl cresyl phosphate, red phosphorus; reaction retarders, for example substances showing an acidic reaction, such as hydrochloric acid or organic acid halides, cell regulators known per se, such as paraffins or fatty alcohols or dimethyl polysiloxanes, pigments or dyes, stabilizers against the effects of ageing and weathering, plasticizers, fungistatic and bacteriostatic agents and also fillers, such as barium sulfate, kieselguhr, carbon black or whiting. These optional auxiliaries and additives are also known in the art and are described, for example, in German Offenlegungsschrift 2,732,292, pp. 21–24.

Further examples of surface-active additives and foam stabilizers, cell regulators, reaction retarders, stabilizers, flameproofing agents, plasticizers, dyes, fungistatic and bacteriostatic agents which may optionally be used in accordance with the invention and information on the use of these auxiliaries and additives and the way in which they work can be found in Kunststoff-Handbuch, Vol. VII, edited by Vieweg and Höchtlen, Carl-Hanser-Verlag, München 1966, for example on pages 103–113.

The reaction components can be reacted by the known one-shot process, by the known prepolymer process or by the known semiprepolymer process, often using machines, for example the machines described in U.S. Pat. No. 2,764,565. Information on processing machines which may also be used in accordance with the invention can be found in Kunststoff-Handbuch, Vol. VII, edited by Vieweg and Höchtlen, Carl-Hanser-Verlag, München 1966, for example on pages 121–205.

According to the invention, the foaming process is preferably carried out at an index of 150 to 600 and preferably in the range from 200 to 400.

The foams can be produced by slabstock foaming or by the laminator process known per se.

The products obtainable in accordance with the invention are used, for example, as insulating panels for roof insulation.

The invention is further illustrated but is not intended to be limited by the following examples in which all parts and percentages are by weight unless otherwise specified.

EXAMPLES

In the examples, various rigid foams were prepared based on the formulations set forth in Tables 1 and 2. The polyols A and B respectively were mixed with the catalyst, blowing agent and stabilizer, and the mixture obtained was mixed with the polyisocyanate. The reaction mixture was poured into an open mold (20 cm × 20 cm × 16 cm) and allowed to foam. The results obtained were as indicated in the tables. The following materials were used:

Polyol A

A polyol mixture (OH number 198) of the following components was prepared:
- 45 pads by weight of a polyether (OH value 185) prepared by reaction of ethylene glycol with ethylene oxide,
- 8 pads by weight diethylene glycol (OH value 1060)
- 5 pads by weight of a polyester prepared by reaction of phthalic anhydride with benzyl alcohol and butanol (OH value zero)
- 27 parts by weight of the commercial flameproofing agent Disflamoll ® DPK (Ciba Geigy Plastics and Additives Co.)
- 15 parts by weight of a polyester (OH value 200) prepared by reaction of adipic acid and phthalic anhydride with diethylene glycol Polyol B:

A polyol mixture (OH number 228) of the following components was prepared:
- 12 parts by weight of a polyester polyol (OH value 300) prepared by reaction of phthalic anhydride with diethylene glycol and ethylene oxide
- 25 parts by weight of a polyether (OH value 180) prepared by reaction of ethylene glycol with ethylene oxide
- 10 parts by weight of a polyester prepared by reaction of phthalic anhydride and benzyl alcohol and butanol (OH value zero)
- 27 parts by weight of the flameproofing agent DEEP (diethyl ethyl phosphonate)
- 15 parts by weight of a polyester (OH value 200) prepared by reaction of adipic acid and phthalic anhydride with diethylene glycol
- 11 parts by weight diethylene glycol (OH value 1060)

TABLE 1

| Examples | Formulation in parts by weight | | | | | | |
|---|---|---|---|---|---|---|---|
| | 1 | 2 | 3 | 4 | 2A | 3A | 3B |
| Polyol A | 98 | 98 | 98 | 98 | 98 | 98 | 98 |
| Dimethyl cyclohexyl amine | 0.14 | 0.18 | 0.14 | 0.18 | 0.18 | 0.14 | 0.2 |
| Potassium acetate solution[1] | 0.54 | 0.7 | 0.54 | 0.7 | 0.7 | 0.54 | 0.54 |
| Water | — | — | — | — | — | — | 1.0 |
| Cyclopentane | 8 | 12.5 | — | — | — | — | — |
| Cyclopentane/n-pentane (80/20% by weight) | — | — | — | — | 12.5 | — | — |
| Cyclopentane/n-pentane (15/85% by weight) | — | — | 8 | 12.5 | — | — | — |
| Cyclopentane/n-pentane (40/60% by weight) | — | — | — | — | — | 8 | 4 |

TABLE 1-continued

| Examples | Formulation in parts by weight | | | | | | |
|---|---|---|---|---|---|---|---|
| | 1 | 2 | 3 | 4 | 2A | 3A | 3B |
| Stabilizer B 1605 (Bayer AG) | 2 | 2 | 2 | 2 | 2 | 2 | 2 |
| Polyisocyanate (crude MDI, Desmodur ® 44V20. (Bayer AG) (NCO content 31,5% by weight) | 103 | 166 | 103 | 166 | 166 | 103 | 118 |
| Index | 219 | 351 | 219 | 351 | 351 | 219 | 219 |
| Density [kg/m$^3$] | 42 | 39 | 42 | 40 | 39 | 41 | 42 |
| Adhesion of paper skin after 24 hours | Good | Good | Good | Good | Good | Good | Good |
| ①Flame height in the small burner test DIN 4102 [mm] | 130 | 120 | 130 | 120 | 122 | 131 | 135 |
| DIN 4102 classification | B2 | B2 | B2 | B2 | B2 | B2 | B2 |
| Dimensional stability[2] | S | S | NS | NS | S | NS | NS |
| Surface brittleness | None | None | None | None | None | None | None |

[1] 25% solution in diethylene glycol
[2] S = shrinkage, NS = no shrinkage

The Examples in Table 1 show that, where mixtures of less than 50% by weight cyclopentane and more than 50% by weight n-pentane are used as blowing agents, dimensionally stable rigid PU foams are obtained, even in conjunction with water as blowing agent.

TABLE 2

| Example | Formulation in parts by weight | |
|---|---|---|
| | 5 | 6 |
| Polyol B | 100 | 100 |
| Dimethyl cyclohexylamine | 0.85 | 0.85 |
| Potassium acetate solution[2] | 2.4 | 2.4 |
| Pentane/cyclopentane (85/15% by weight) | 8.5 | — |
| n-Pentane/cyclopentane (60/40% by weight) | — | 8.5 |
| Polyisocyanate (crude MDI, Desmodur ® 44P75, Bayer AG) (NCO content 28% by weight) | 230 | 230 |
| Index | 271 | 271 |
| Density [kg/m$^3$] | 37.5 | 37.0 |
| Adhesion of paper skin after 24 hours | Good | Good |
| DIN 4102 classification | B2 | B2 |
| Dimensional stability | NS | NS |
| Surface brittleness | None | None |

[2] 40% aqueous solution

Examples 1 and 2 in Table 2 show that, where mixtures of more than 50% by weight n-pentane and less than 50% by weight cyclopentane are used in conjunction with water as blowing agent, dimensionally stable rigid polyurethane foams are obtained.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of rigid foams containing urethane and isocyanurate groups comprising reacting
   a) polyisocyanates with
   b) compounds containing at least two isocyanate-reactive hydrogen atoms and having molecular weights of from 400 to 10,000 and
   c) optionally compounds containing at least two isocyanate-reactive hydrogen atoms and having molecular weights of from 32 to 399 in the presence of
   d) one or more isocyanurate trimerization catalysts,
   e) mixtures of hydrocarbons as blowing agents, and
   f) optionally, other blowing agents and auxiliaries and additives, wherein mixtures of n-pentane and isopentane with cyclopentane are used as the mixtures of hydrocarbons.

2. The process of claim 1, wherein said mixture of hydrocarbons contains 1 to 50% by weight cyclopentane.

3. The process of claim 1, wherein a mixture of n-pentane and cyclopentane containing 1 to 50% by weight cyclopentane and water is used as blowing agent.

4. The process of claim 3, wherein 1 to 5 parts by weight water are used per 100 parts by weight of component b).

5. The process of claim 1, wherein said foam contains predominant amounts of isocyanurate groups.

* * * * *